(12) United States Patent
Mathias et al.

(10) Patent No.: US 9,454,957 B1
(45) Date of Patent: Sep. 27, 2016

(54) NAMED ENTITY RESOLUTION IN SPOKEN LANGUAGE PROCESSING

(71) Applicant: Amazon Technologies, Inc., Reno, NV (US)

(72) Inventors: Lambert Mathias, Arlington, MA (US); Weam Abu Zaki, Seattle, WA (US); Ying Shi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 13/786,237

(22) Filed: Mar. 5, 2013

(51) Int. Cl.
| | |
|---|---|
| *G01L 15/00* | (2006.01) |
| *G10L 15/04* | (2013.01) |
| *G10L 15/187* | (2013.01) |
| *G10L 15/02* | (2006.01) |
| *G10L 15/22* | (2006.01) |
| *G10L 15/26* | (2006.01) |

(52) U.S. Cl.
CPC ............. *G10L 15/04* (2013.01); *G10L 15/187* (2013.01); *G10L 15/02* (2013.01); *G10L 15/22* (2013.01); *G10L 15/265* (2013.01)

(58) Field of Classification Search
USPC ......... 704/7, 9, 10, 231, 237, 240, 251, 252, 704/254, 255, 270, 275
See application file for complete search history.

(56) References Cited

U.S. PATENT DOCUMENTS

| | | | | |
|---|---|---|---|---|
| 7,421,387 B2 * | 9/2008 | Godden | ................... | G01L 15/08 704/200 |
| 7,720,674 B2 * | 5/2010 | Kaiser et al. | ...................... | 704/9 |
| 2010/0030723 A1 * | 2/2010 | Au | .................................. | 706/55 |
| 2010/0305947 A1 * | 12/2010 | Schwarz | ............. | G01L 15/1815 704/252 |

* cited by examiner

*Primary Examiner* — Vu B Hang
(74) *Attorney, Agent, or Firm* — Knobbe, Martens, Olson & Bear, LLP (57) ABSTRACT

Features are disclosed for determining an element of a user utterance or user intent in conjunction with one or more related elements of the user utterance or user intent. A user utterance may be transcribed by an automatic speech recognition ("ASR") module, and the results may be provided to a natural language understanding ("NLU") module. The NLU module may perform named entity recognition, intent classification, and/or other processes on the ASR results. In addition, the NLU module may determine or verify the values associated with the recognized named entities using a data store of known values. When two or more named entities are related, their values may be determined and/or verified in conjunction with each other in order to preserve the relationship between them.

26 Claims, 5 Drawing Sheets

NAMED ENTITY RESOLUTION IN SPOKEN LANGUAGE PROCESSING

BACKGROUND

Spoken language processing systems include various modules and components for receiving speech input from a user, determining what the user said, and determining what the user meant. In some implementations, a spoken language processing system includes an automatic speech recognition ("ASR") module that receives audio input of a user utterance and generates one or more likely transcriptions of the utterance. Spoken language processing systems may also include a natural language understanding ("NLU") module that receives input, such as a transcription of a user utterance generated by the ASR module, and determines the meaning of the input in a way that can be acted upon, such as by a computer application.

An NLU module can identify particular words (e.g., named entities) in the transcription. Based on those named entities, the NLU module can identify a user's intent, and generate an output that may be used by an application to respond or otherwise perform an action regarding the user's intent. For example, a user of a mobile phone may issue a spoken command to play a particular song. Audio of the spoken command can be processed and transcribed by the ASR module, and the NLU module can determine the user's intent from the transcription (e.g., that the user wants to initiate playback of a song) and initiate playback of the song.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Spoken language processing systems can process audio data of spoken user input into one or more possible transcriptions of what the user said. Spoken language processing systems can then identify the meaning of what the user said in order to take some action in response to the spoken input from the user. In some spoken language processing systems, an automatic speech recognition ("ASR") module may utilize various models (e.g., language models, acoustic models) when determining the content of a spoken user interaction, also known as an utterance. Other modules, such as a natural language understanding ("NLU") module, may interpret the user's words as determined by an ASR module to identify a likely interpretation of the user's intent (e.g., an action the user would like to initiate).

For example, if a user has requested playback of a particular song by a particular artist, the NLU module may identify an artist name and song name, based on the input from the ASR module, that likely correspond to the particular song and artist specified by the user. The NLU module may then determine that the user wishes to hear the likely song by the likely artist. Based on this determination, the NLU module can provide data to an application (e.g., a music playback application) regarding the likely song by the likely artist that the user wishes to hear. However, if the NLU module does not first verify that the likely artist has recorded the likely song, or that the version of the likely song by the likely artist is the one that best corresponds to the user's intent, the NLU module may provide invalid or erroneous data to the music playback application. When the NLU module provides invalid or erroneous data, the music playback application may be unable to play the correct song or, in some cases, any song (e.g., the likely artist has not recorded the likely song). As a result, the music playback application may experience an error or require additional interaction with the user (e.g., prompt the user regarding which artist name or which song name the user originally spoke). Such errors or additional interactions can negatively affect both the performance of the spoken language processing system and the user's experience.

Aspects of this disclosure relate to verifying, prior to providing a result to an application, the content of data that an NLU module processes and generates. Such verification can reduce or minimize the cases in which the NLU provides an invalid or erroneous result. In addition, the NLU module can take a more holistic approach to determining the likely user intent based on all of the information available to the NLU module, or a larger portion thereof than is used by conventional NLU modules, rather than relying upon a most likely transcription or interpretation of each individual piece of data. Such a holistic approach can increase the likelihood that an NLU module correctly interprets the user's intent in situations where a user's intent is a function of multiple interrelated data items, and can preserve relationships between the interrelated data items.

NLU modules generally break down input, such as an N-best list or lattice of transcriptions from an ASR module, into discrete terms, also known as named entities. The named entities can provide data regarding aspects of the user's intent. In the music playback example, the artist name may be a first named entity, the song title may be a second named entity, and so on. NLU modules use the named entities to identify the user's intent. In addition, NLU modules can provide named entities as output to other modules of a spoken language processing system, such as a particular application module. By verifying that the content of a particular named entity is a value that is known to be associated with the named entity, the likelihood of providing invalid or erroneous output is reduced. In addition, by determining the content of two or more related named entities in conjunction with each other (e.g., song name and artist name), the likelihood of accurately determining the value of each named entity and accurately identifying the user's intent is increased.

For example, a user may issue a spoken command to get directions to a particular address. In a process referred to as named entity recognition, the NLU module may identify several named entities from one or more likely transcriptions, such as the street address, street name, and city. Rather than rely on the transcription of each named entity, the NLU module can verify that the value of each named entity is a valid value through a process that may be referred to as named entity resolution. Because street address, street name, and city are interrelated (e.g., a city has a finite number of individual streets, each street has a predetermined range of valid addresses, etc.), the NLU module can resolve the content of each named entity in conjunction with the others to ensure that the relationships between the named entities are validated and preserved (e.g., by querying a data store for results that satisfy the relationship between the named entities, or by selecting particular results from the data store based on the relationship between the named entities).

Additional aspects of the disclosure relate to using certain NLU results, such as partial or preliminary results, in order to rescore ASR output or re-run some or all of the ASR processing. For example, an ASR module may provide a lattice of results to an NLU module. The NLU module may determine the value of a particular named entity (e.g., city name) with a high degree of confidence, but may not be able to determine the value of a related named entity (e.g., street name) with a satisfactory degree of confidence. The NLU module can initiate a rescoring of the lattice of results such that those results with the already-determined city name are assigned a higher score or are otherwise considered to be more likely transcriptions. Doing so may increase the likelihood that a valid street name is identified for the city. In some embodiments, the ASR module can re-process the user utterance based on the already-determined city name. For example, the ASR module may use models (e.g., language models) that are optimized for locations in the particular city and therefore may be more helpful in recognizing speech and producing results with a valid street name associated with the city.

Although aspects of the embodiments described in the disclosure will focus, for the purpose of illustration, on a spoken language processing system processing user utterances related to playing music, one skilled in the art will appreciate that the techniques described herein may be applied to any subject or domain of spoken language processing. For example, a system implementing the features described herein may process user utterances related to phone dialing, shopping, getting directions, playing music, performing a search, and the like. In addition, aspects of the embodiments described herein focus, for the purpose of illustration, on a client device that transmits data to a networked spoken language processing system for processing. However, the systems and techniques described herein may be implemented on a single device, such as a user device that both receives spoken input and processes the input to determine the user's intent. Various aspects of the disclosure will now be described with regard to certain examples and embodiments, which are intended to illustrate but not limit the disclosure.

Figure 1:
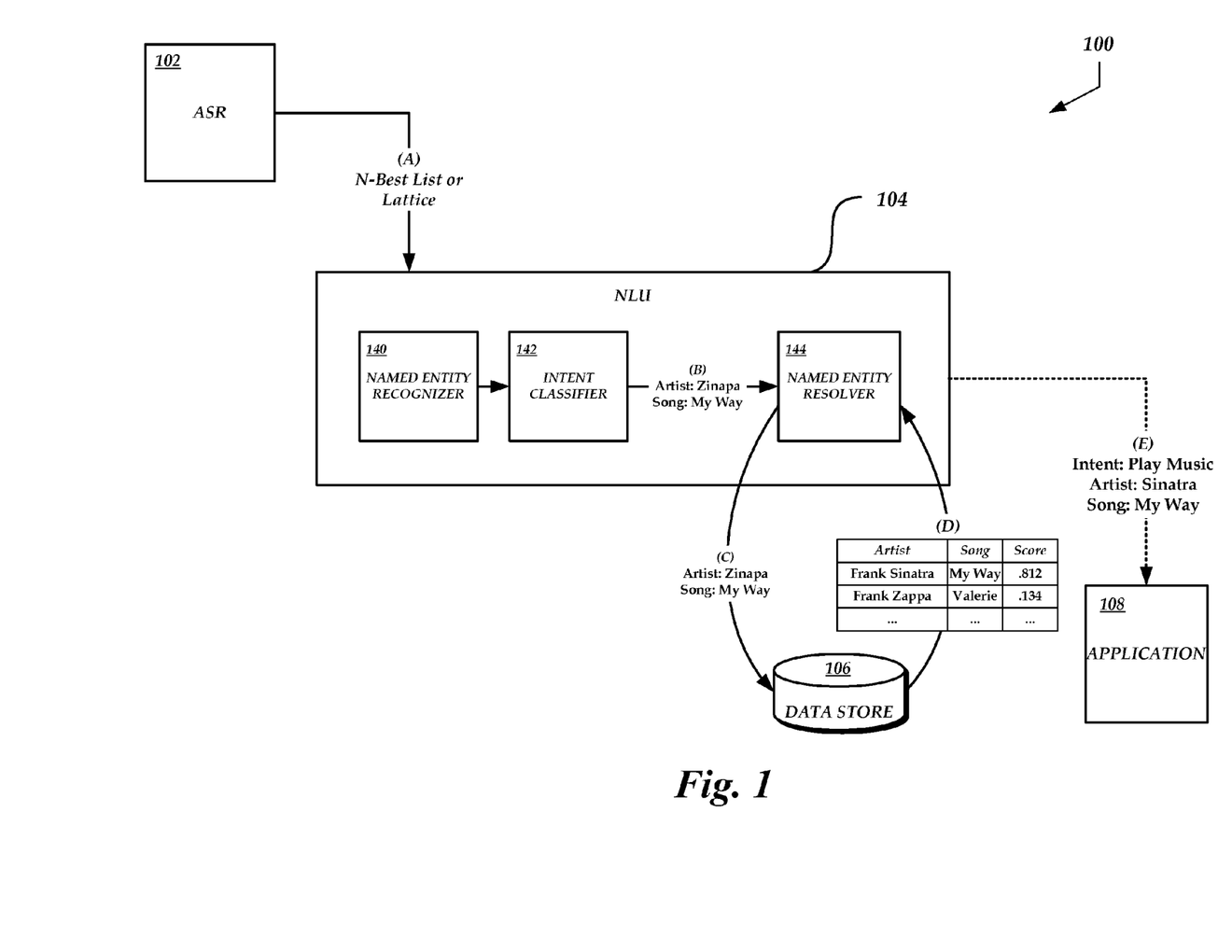
FIG. 1 is a block diagram of an illustrative spoken language processing system, showing illustrative interactions between an automatic speech recognition module, a natural language understanding module, and a data store during processing of an utterance.
Figure 2:
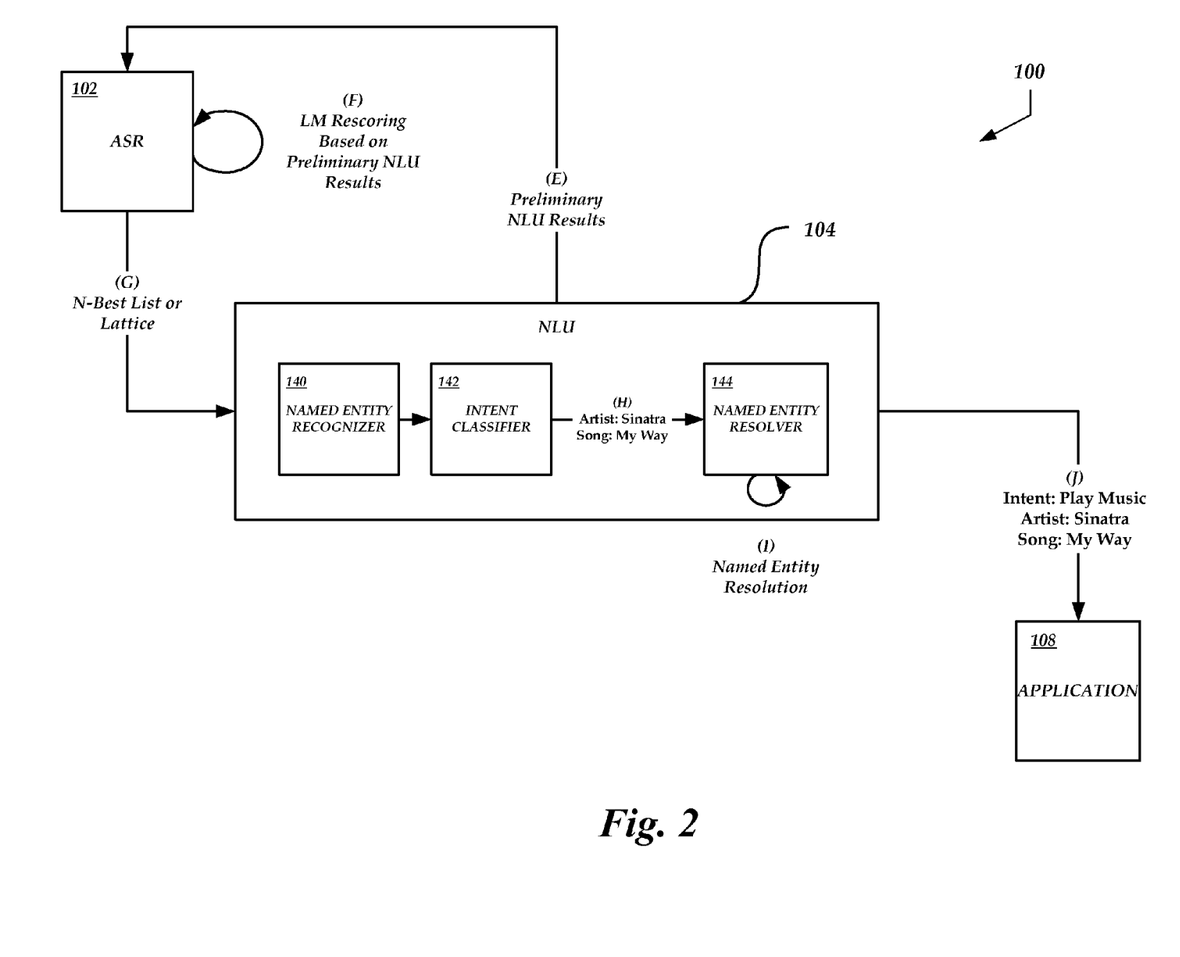
FIG. 2 is a block diagram of an illustrative spoken language processing system, showing illustrative interactions between an automatic speech recognition module, a natural language understanding module, and an application when preliminary results are used to perform some or all of the processing again.

With reference to an illustrative example, a user may issue spoken commands or otherwise make spoken utterances to a client device, such as a mobile phone or tablet computer. The utterances may be transmitted to a network-accessible spoken language processing system, which processes the utterances and takes some action in response. FIGS. 1 and 2 illustrate such a spoken language processing system 100.

The spoken language processing system 100 illustrated in FIGS. 1 and 2 includes an ASR module 102 to process the utterance and transcribe what the user said. The ASR module 102 can output one or more likely transcriptions. For example, the ASR module 102 may output a lattice or N-best list of likely transcriptions. In some embodiments, the lattice or N-best list may include scores indicating a confidence in each transcription or portion thereof The spoken language processing system 100 may use an NLU module 104 to determine the user intent based on the output from the ASR module 102. The NLU module 104 may include a named entity recognizer 140, an intent classifier 142, and a named entity resolver 144. Some embodiments may include fewer or additional components or modules, rather than only those shown in the NLU module 104 of FIG. 1.

The NLU module 104 can query a data store 106 to verify the content of various named entities. The data store 106 may include data regarding the named entities associated with the subject matter, or domain, of the current utterance and other domains in which the spoken language processing system 100 is configured to process utterances. The data store 106 may include flat or relational data regarding the named entities, such as tables regarding an artist and links to the various albums and songs that the artist has recorded. In some embodiments, the data store may be a relational database, a hierarchical knowledge base, or any other catalog or repository of data regarding the named entities that the NLU module 104 recognizes. Although the data store 106 in FIG. 1 is shown separately from the NLU module 104, in some embodiments the NLU module 104 may include an integrated data store 106.

Various applications, such as the application 108 of FIG. 1, can use the output of the NLU module 104 to respond to user utterances or take actions in response to user utterances. Separate applications 108 may be implemented within the spoken language processing system 100 to perform different tasks. For example, the spoken language processing system 100 may include separate applications 108 for playing music, providing directions, performing searches, purchasing products, providing personal information management (e.g., calendars or contacts) and the like.

In operation, the NLU module 104 can receive a transcription or N-best list of transcriptions at (A), such as those generated by an ASR module 102. The NLU module 104 may then initiate processing of the transcription(s) to determine the user intent. The named entity recognizer 140 can label or tag individual words or phrases as named entities that may provide data important in determining the user intent and initiating a response or other action. For example, in the utterance "I want to play My Way by Frank Sinatra," the words "I," "want," and "to" may be labeled as "other" because they do not, by themselves, indicate any specific user intent or provide any meaningful information. The next word, "play," indicates the command that is to be performed. Such a word or token may be labeled as trigger named entity, because it indicates that the user wishes to trigger a particular action, such as the playing of a song. The phrase "My Way" (or each individual word thereof) may be labeled as a named entity of type "song title," while the phrase "Frank Sinatra" (or each individual word thereof) may be labeled as a named entity of type "artist." Finally, the word "by" may be labeled "other," because it is not actionable and provides no additional information. However, even words labeled "other" may be used to label other tokens. For example, the word "by" may be an important indicator that what follows is the name of a musical artist, particularly when the word "by" is preceded by a song title. In some embodiments, each named entity (or a subset of all named entities in the current request) may be associated with a score. The score can indicate, e.g., confidence in the accuracy of the named entity determination.

The intent classifier 142 can receive input from the named entity recognizer 140 and determine the most likely user intent. For example, the named entity recognizer 140 may label the token "play" as a user intent. The intent classifier 142 can determine which command or other response most likely captures the user intent. Illustratively, the NLU module 104 may determine that in the music domain a command to play a song (e.g., a programmatic "playSong( . . . )" command with arguments for an artist and song title) corresponds best to the user intent and should be generated and passed to the appropriate application 108 (e.g., a music playback application). Various named entities, or data regarding the named entities, may also be provided to the application 108. In the present example, data indicating that the named entity "song" has a value of "My Way" and "artist" has value of "Frank Sinatra" may be generated at (B).

Prior to providing the user intent and other named entities to an application 108, the named entity resolver 144 of the NLU module 104 may resolve the named entities by verifying their contents against records in a data store 106. The named entity resolver 144 can then output a resolved named entity. The named entity resolver 144 can ensure that, e.g., the contents of the "artist" named entity accurately reflect a known musical artist. If the results from the ASR module 102 included the words "Frank Zinapa" and the named entity recognizer 140 identified those words as an "artist," the named entity resolver 144 can query the data store 106 for the musical artists most likely to correspond to input of "Frank Zinapa." For example, the data store 106 may perform a phonetic comparison (e.g., by generating soundex interpretations of the search terms and data store values, by generating phoneme sequences, etc.). In the present example, the data store 106 may return a list of results for the query "artist=Frank Zinapa." The top result (e.g., the result with the highest confidence score) may be "Frank Sinatra," the second result may be "Frank Zappa," and so on, while there may not be any result for "Frank Zinapa." The named entity resolver may then assign "Frank Sinatra" as the value of the "artist" named entity. In some embodiments, the data store may return an N-best list of results (e.g., a list that includes results for both Frank Sinatra and Frank Zappa).

In addition to, or instead of, verification of individual named entities, the named entity resolver 144 can perform named entity resolution based on a relationship between two or more named entities. In the present example, the named entity resolver 144 may query the data store 106 for both artists and songs at (C). Each result received from the data store 106 at (D) may be associated with a confidence score. The data store 106 or some other component may prepare the results and confidence scores in many different ways. For example, the data store 106 may combine scores of individual items to determine a score for a combination of items. In some embodiments, scores for particular items may be weighted more heavily than others when determining a score for a combination.

Illustratively, the data store 106 may determine that for the artist, "Frank Zappa" is the most likely result, while "Frank Sinatra" is the second most likely. This determination may be made based on a phonetic comparison between the input and the various results, etc. The data store 106 may determine that for the song, "My Way" is the most likely result, and there may be any number of less likely results. The data store 106 may then calculate a likelihood or confidence for each artist and song pair that is identified in the results (e.g., by summing the confidence scores for the respective artist and song). In the present example, "Frank Zappa" is the top artist result, and therefore may be associated with the highest confidence score among the artist results. However, although Frank Zappa is an actual artist known to the data store 106, he did not record or perform a song titled "My Way," which was the top song result associated with the highest confidence score among the song results. The data store 106 may analyze the preliminary "song" results to determine whether a song performed by or otherwise associated with Frank Zappa is included. If such a song is found, the confidence score for the particular song may be combined with (e.g., by addition or multiplication) the confidence score assigned to "Frank Zappa" as the artist, producing a total score (e.g., total score=X+Y, where X is a score the artist of the combination, and Y is a score for the song of the combination). In some embodiments, the scores for one or more of the items in the combination may be weighted more heavily than others (e.g., total score=X*A+Y*B, where X is a score the artist of the combination, Y is a score for the song of the combination, and A and B are weighting factors for the artist and song, respectively). Similar calculations may be made with respect to the other artists in the results and/or the other songs in the results.

In some embodiments, rather than identifying likely results for individual items or named entities and then identifying likely combinations based on individual scores, the spoken language processing system 100 may instead model valid combinations of named entities as documents and implement or utilize a document search engine. For example, valid artist/song combinations may be abstracted or transformed into documents, and information about the combination may be indexed for use by a document search engine. Illustratively, a document representing the song My Way by Frank Sinatra may have any number of index values that can be searched, such as: artist=Frank Sinatra; artist=Frank; artist=Sinatra; song=My Way; song=My; song=Way, etc. In some embodiments, N-grams may be indexed (e.g., combinations of any number of words, such as 3-grams); N-phones may be indexed (e.g., combinations of any number of phonemes, such as triphones); and the like. The values that are indexed may be transformed, such as by using soundex transformations or other phonetic transformations. Search engine techniques, such as Term Frequency/Inverse Document Frequency (TF-IDF) may be used to search the data that has been abstracted as documents. For example, the search terms may be transformed using the same or similar techniques as the index values (e.g., soundex transformations), and the search may be run on those index values. Results from the search engine may be ranked or scored according to the relevance of each result.

As seen in FIG. 1, the score for the combination of "Frank Sinatra" as the artist and "My Way" as the song is greater than any such score for another artist/song combination in the results. The named entity resolver 144 may therefore determine that content or value for the "artist" named entity is "Frank Sinatra," even though the most likely result from the ASR processing was "Frank Zinatra," and the most likely result from a single named entity resolution process based only the "artist" named entity may have been a different artist, such as "Frank Zappa."

The user intent (e.g., play music) along with the resolved named entities (Play, Frank Sinatra and My Way) may then be provided at (E) to an application 108, such as a music playback application. In the present example, the application 108 may generate a command that may be sent back to the user device to begin playback of a local copy of the song. In some embodiments, the application 108 may cause streaming of the song to the user device to begin.

In some embodiments, rather than provide a single result to the application 108, a list of results may be provided such that the application 108 can perform additional processing or chose the best result for its own needs. For example, the intent classifier 142 may provide an N-best to the named entity resolver 144. For each intent in the N-best list, the named entity resolver 144, data store 106, or some other component may obtain the best validated combination. The N-best list of intents and corresponding search results may then be provided to the application 108. In some embodiments, the intents and search results may be ranked or scored according to the original N-best intents, according to the relevance or confidence scores associated with the search results, according to a sum or product of the two, according to a weighted sum or product of the two, etc. In some cases, the scores associated with each search result may be normalized, and the results provided to the application 108 may be scored or ranked according to the normalized search result scores. As another example, an N-best list of search results may be obtained for each of the N-best intents, and therefore multiple N-best lists may be provided to the application: one N-best list of search results for each of the N-best intents from the intent classifier 142.

In some embodiments, the results obtained or produced by the named entity resolver 144 may not be satisfactory. For example, no combination may have been obtained with a score that meets or exceeds some threshold, or no combination may be been obtained at all. However, the named entity resolver 144 or some other component may have obtained a satisfactory result for one or more of the named entities. In such cases, a second speech processing pass, including some or all of the spoken language processing operations that were previously run, may be run based on the partial results. Advantageously, the second speech processing pass may produce more accurate or otherwise better results when it is based on preliminary NLU processing results.

FIG. 2 illustrates a second speech processing pass based on preliminary NLU results. As seen in FIG. 2, at (E) preliminary NLU results are provided to the ASR module 102, instead of the final results that are provided at (E) to the application 108 in FIG. 1. The preliminary NLU results may include data about one or more named entities that have been resolved. For example, the output from the intent classifier 142, as described in FIG. 1, included a named entity of type "artist" with a value of "Frank Zinapa," and a named entity of type "song" with a value of "My Way." The named entity resolver may have determined that "My Way" is a likely value for the song named entity, but that no satisfactory value could be found for a combination of song and artist.

At (F) the ASR process may be re-run, or results from the first ASR pass may be re-scored, based on the preliminary NLU results indicating that the song title is My Way. For example, language model ("LM") rescoring may be performed on the lattice of ASR results from the first speech processing pass. The language model that is used during the rescoring may be modified to provide higher scores for artists that have performed songs titled My Way. Illustratively, N-grams or N-phones that are found in the names of artist that have performed a song titled My Way may be given higher values. When the lattice of ASR results is rescored, any results that include those N-grams or N-phones may be given higher scores than they were given originally. The rescored lattice may then be provided to the NLU module 104 at (G). Named entity recognition and intent classification may be performed as described above. The results provided at (H) to the named entity resolver 144 may include Frank Sinatra for the artist named entity partly because ASR results that included Frank Sinatra were given higher scores during the rescoring at (F). Named entity resolution may be performed at (I) using any of the techniques described above, and results may be output at (J) to an application 108 as described above.

In some embodiments, the spoken language processing system may include a multi-domain NLU engine that can have any number of domain-specific NLU modules configured to operate on text related to a particular subject matter or in a particular domain (e.g., getting directions, shopping, initiating communication with a contact, performing a search, or playing music). Domain-specific NLU modules may process text, such as a transcription, with respect to a particular domain and produce a result indicating the user's intent. Another component of the multi-domain NLU engine may then determine the most likely result from the several domain-specific NLU modules. One example of a multi-domain NLU engine is described in U.S. patent application Ser. No. 13/720,909, titled Architecture for Multi-Domain Utterance Processing and filed on Dec. 12, 2012, the contents of which are hereby incorporated by reference in their entirety.

Distributed Spoken Language Processing System Environment

Figure 3:
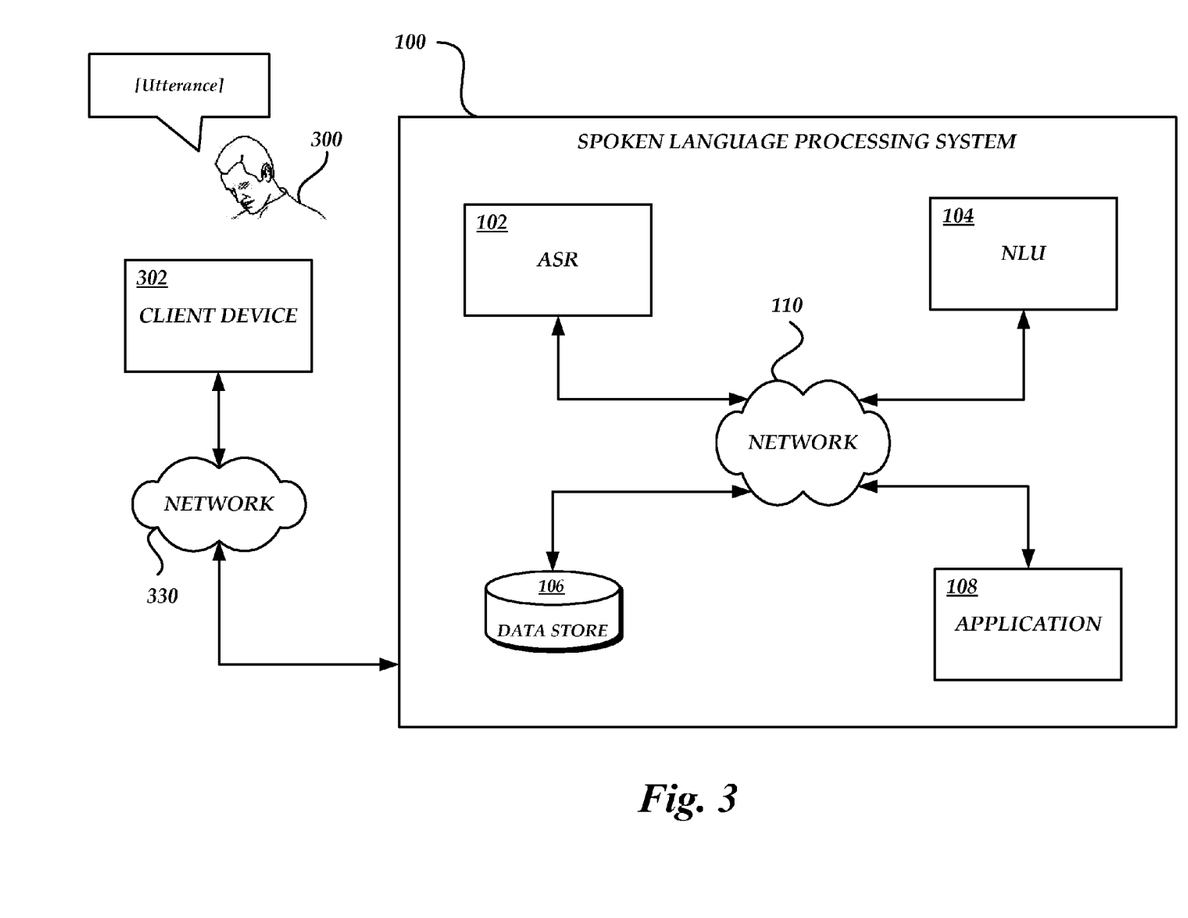
FIG. 3 is a block diagram of an illustrative networked environment in which a spoken language processing system may be implemented

Prior to describing embodiments of processes for analyzing related named entities in detail, an example environment in which the processes may be implemented will be described. FIG. 3 illustrates a spoken language processing system 100 and a client device 302. The spoken language processing system 100 can be a network-accessible system in communication with the client device 302 via a communication network 330, such as a cellular telephone network or the Internet. A user 300 may use the client device 302 to submit utterances, receive information, and initiate various processes, either on the client device 302 or at the spoken language processing system 100. For example, the user 300 can issue spoken commands to the client device 302 in order to get directions or listen to music, as described above.

The client device 302 can correspond to a wide variety of electronic devices. In some embodiments, the client device 302 may be a mobile device that includes one or more processors and a memory which may contain software applications executed by the processors. The client device 302 may include a speaker or other audio output component for presenting or facilitating presentation of audio content. In addition, the client device 302 may contain a microphone or other audio input component for accepting speech input on which to perform speech recognition. Illustratively, the client device 302 may be a mobile phone, personal digital assistant ("PDA"), mobile gaming device, media player, electronic book reader, tablet computer, laptop computer, or the like. The software of the client device 302 may include components for establishing communications over wireless communication networks or directly with other computing devices.

The spoken language processing system 100 can be any computing system that is configured to communicate via a communication network. For example, the spoken language processing system 100 may include any number of server computing devices, desktop computing devices, mainframe computers, and the like. In some embodiments, the spoken language processing system 100 can include several devices physically or logically grouped together, such as an application server computing device configured to perform speech recognition on an utterance and a database server computing device configured to store records and speech recognition models.

The spoken language processing system 100 can include an ASR module 102, an NLU module 104, data store 106, and one or more applications 108. In some embodiments, the spoken language processing system 100 can include various modules and components combined on a single device, multiple instances of a single module or component, etc. For example, the spoken language processing system 100 may include a separate database server that may be configured with a data store 106; a server or group of servers configured with both ASR and NLU modules 102, 104; and a server or group of servers configured with applications 108. In multi-device implementations, the various devices of the spoken language processing system 100 may communicate via an internal communication network 110, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network 330. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 330 may be a publicly accessible network of linked networks, possibly operated by various distinct parties, such as the Internet. In other embodiments, the network 330 may include a private network, personal area network ("PAN"), LAN, WAN, cable network, satellite network, etc. or some combination thereof, each with access to and/or from the Internet. For example, the devices of the spoken language processing system 100 may be located within a single data center, and may communicate via a private network as described above. The client device 302 may communicate with spoken language processing system 100 via the Internet. The client device 302 may have access to the Internet via a wired or WiFi connection, or via a cellular telephone network (e.g., a Long Term Evolution or LTE network).

Process for Resolving Multiple Named Entities

Figure 4:
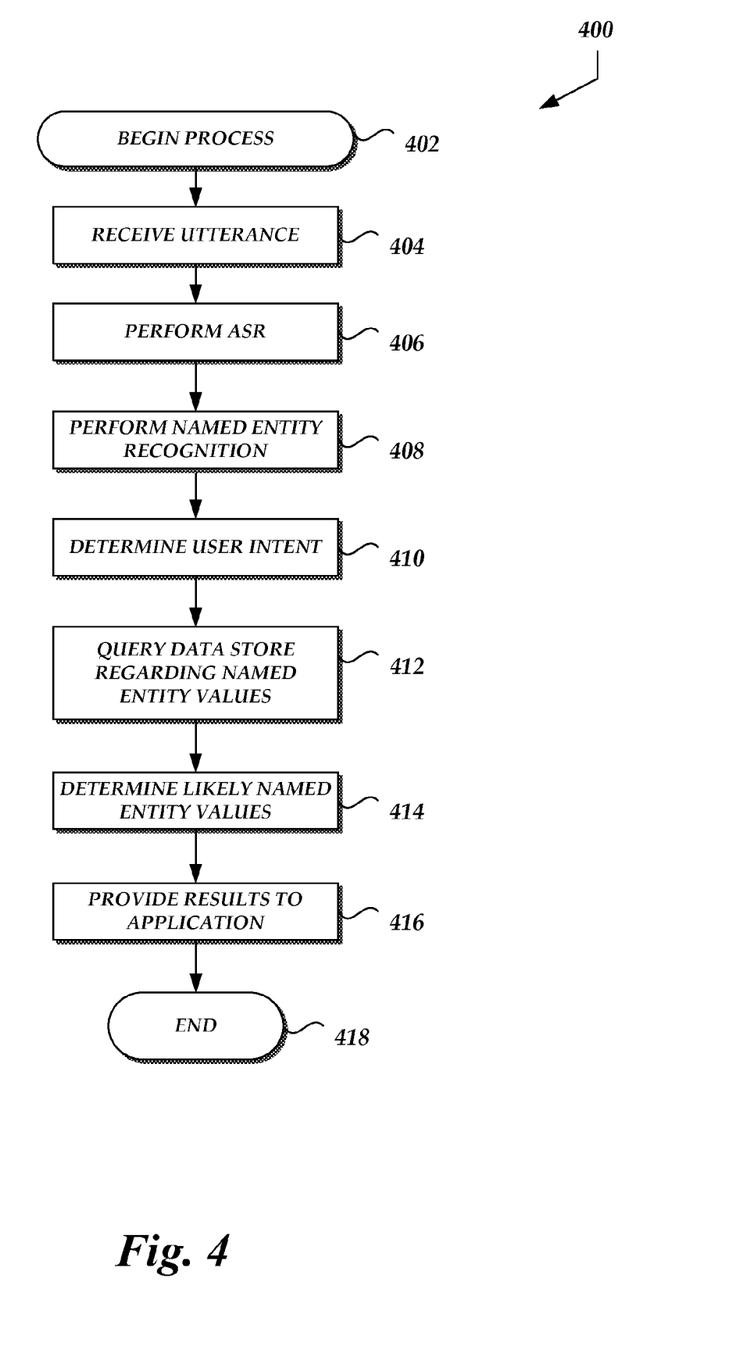
FIG. 4 is a flow diagram of an illustrative process for processing an utterance by resolving named entities in combination.

With reference now to FIG. 4, a sample process 400 for processing a user utterance to determine a user intent will be described. Advantageously, an NLU module 104 of a spoken language processing system 100 performing the process 400 can resolve multiple named entities in relation to each other. Knowing the value of one of the named entities can help in recognizing another named entity, and identifying the values of multiple named entities together can help to identify the values even when no single named entity value is known to a high degree of confidence.

The process 400 begins at block 402. The process 400 may begin automatically upon initiation of a speech recognition session. The process 400 may be embodied in a set of executable program instructions stored on a computer-readable medium, such as one or more disk drives, of a computing system of the spoken language processing system 100. When the process 400 is initiated, the executable program instructions can be loaded into memory, such as RAM, and executed by one or more processors of the computing system.

At block 404, the spoken language processing system 100 can receive an utterance from a client device 302. As described above, the user utterance may be a spoken command to play a recorded music file.

At block 406, the spoken language processing system 100 can perform speech recognition processing on the utterance. An ASR module 102 may utilize various models (e.g., language models, acoustic models) when determining the textual content of an utterance. The output of the ASR module 102 may be a lattice or N-best list of likely transcriptions of the user utterance. In some embodiments, rather than processing the utterance into textual transcriptions, the ASR module may process the utterance into one or more phonemic transcriptions (e.g., the lattice or N-best list contains the utterance transcribed into a sequence of phonemes rather than text). In some embodiments, the ASR module 102 may utilize models specialized for a particular subject matter, also known as a domain, when the ASR module 102 knows the domain to which the utterance relates. Such specialized models can improve the efficiency and accuracy of the ASR module 102.

At block 408, the NLU module 104 can perform named entity recognition on the output of the ASR module 102 (or textual or phonemic data from some other source), such as a lattice of likely transcriptions. A named entity recognizer 140 or some other component of the NLU module 104 can identify named entities or other terms of particular importance to the interpretation of the user utterance. In the present example, the named entity recognizer 140 may identify an artist name, a song title, and/or other named entities relevant to music playback.

At block 410, the intent classifier 142 or some other component of the NLU module 104 can determine the likely user intent based on the named entities identified by the named entity recognizer 140.

At block 412, the named entity resolver 144 or some other component of the NLU module 104 can query a data store 106 and verify the accuracy of the named entity values. For example, the named entity resolver 144 can query the data store 106 with multiple related named entity values and receive one or more sets of results, such as a separate set of results for reach named entity (e.g., a list of the most likely matches for the artist named entity, and a list of the most likely matches for the song named entity). What is returned to the named entity resolver 144 may be a set of one or more records that match the artist, and one or more records that match the song title, to varying degrees of confidence. The set may be ranked and/or include confidence scores for each result. A confidence score may reflect the degree to which a result likely matches the original spoken words or the submitted named entity values. In some embodiments, the data store 106 may return validated named entity combinations, as described above with respect to FIG. 1.

In some embodiments, the named entity resolver 144 may submit a named entity query to the data store 106 with phonemic representations of the named entities identified by the named entity recognizer 140, rather than textual representations. The data store 106 may maintain an index on the phonemes of the named entity values stored therein instead of, or in addition to, the textual representation of the named entity values. Using phonemes can help reduce issues with homographs, mispronunciations, misspelled words, and the like.

At block 414, the named entity resolver 144 can determine the most likely values for the named entities using the results from the data store 106. For example, if the data store 106 does not return validated named entity combinations, the named entity resolver 144 can combine (e.g., sum or product) confidence scores or rankings for artist/song pairs when the artist is known to perform or otherwise be associated with a recording of the song. The named entity resolver 144 can then choose the highest scoring artist/song pair and assign the appropriate values to the corresponding named entities prior to providing the named entities as output to an application 108. As a result, the NLU module 104 can be assured that likelihood of providing invalid output is reduced or minimized.

In some embodiments, the data store 106 may return a single set of results for the combination of named entities. What is returned to the named entity resolver 144 may be a set of one or more artist/song pairs where the artist is known to perform the song or otherwise be associated with a recording of the song. The set may be ranked and/or include confidence scores for each result. For example, the data store 106 may have a data set of combinations of named entities for any number of predetermined user intents. A "play music" user intent may be associated with artist and song named entities, and the data store 106 may have a data set of artist/song combinations. A "get directions" user intent may be associated with city and address named entities, and the data store 106 may have a data set of city/address combinations. The data store 106 may maintain an index on one or more named entities of the combination in order to quickly return results. If the named entity resolver 144 submits a query regarding a particular artist and song title, the data store 106 can quickly locate records with artists that are similar to the specified artist and/or song titles that are similar to the specific song title by using an index of values associated with those named entities. Using the results from the data store 106, the named entity resolver 144 may then identify the most likely values for the named entities.

As another example, a named entity resolver may perform a joint lookup for a validated combination of three named entities (e.g., artist, song, and album), filter the results based on threshold scores regarding the match of each named entity in a result combination to the corresponding named entity in the input combination, and then rank the filtered results. The named entity resolver 144, data store 106, or some other component may identify all matching artists based on a threshold score (e.g., a score indicating the level match between the search term and the identified term in the data store). Illustratively, the threshold may be low so as to increase the number of results that may be returned to work with. The data store 106 may then retrieve all validated artist-song-album combinations for each matching artist. The data store 106 may then filter the validated three-entity combinations based on a (possibly different) threshold score regarding the match of the song to the input. Next, the data store 106 may filter the validated combinations based on a threshold score regarding the match of the album to the input. Finally, the data store 106 can rank the filtered results (e.g., based on the weighted sums of scores for each named entity in the combination).

As a further example, a named entity resolver 144, data store 106, or some other component may obtain valid combinations that match an individual named entity of the input, and then combine all results and filter based combinations that appear in each result set. Illustratively, the data store 106 may first return all validated artist-song-album combinations that match the input artist (e.g., have a score above a threshold regarding the match with the input artist). The data store 106 may then repeat the process for the other named entities, returning a set of validated combinations that match the input song, and a set of validated combinations that match the input album. The data store 106 may then identify the validated combinations that appear in each of the three result sets, and return those results (e.g., in a ranked or ordered list, such as a list using any of the ranking or scoring techniques described above or other appropriate ranking and scoring techniques).

At block 416, the NLU module 104 can output data regarding the likely user intent. For example, the NLU module 104 or some component thereof may provide data regarding the likely user intent, including the named entities, to an application 108.

Process for Rescoring ASR Results or Rerunning ASR Process

Figure 5:
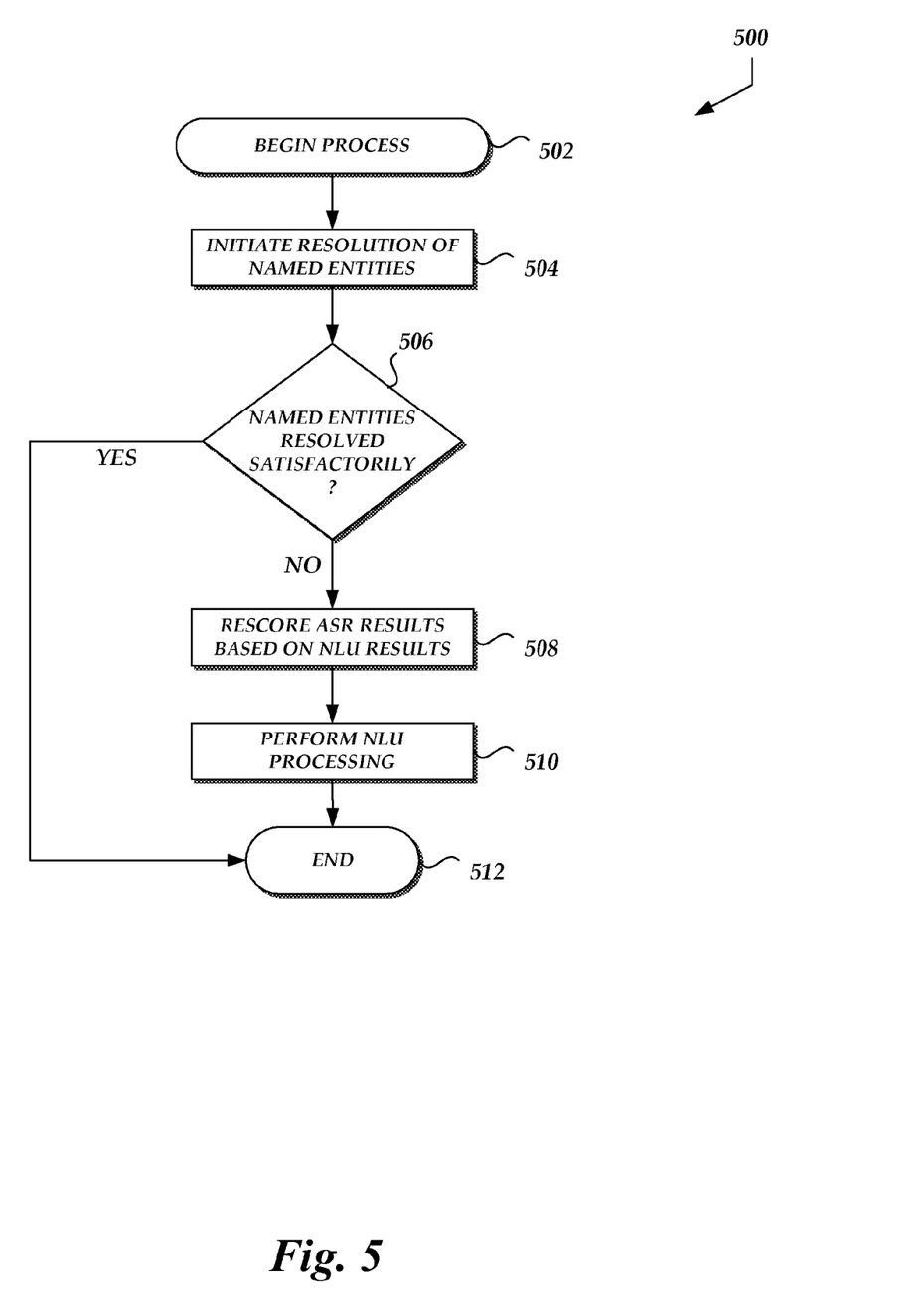
FIG. 5 is a flow diagram of an illustrative process for rescoring or reprocessing automatic speech recognition results based on natural language understanding module results.

FIG. 5 illustrates a sample process 500 for processing ASR results in an NLU Module and, based at least in part on the NLU processing, rescoring the ASR results or rerunning the ASR process in order to obtain higher quality ASR results. Advantageously, by obtaining partial or preliminary NLU results, the ASR process may be rerun with more relevant models selected with the aid of NLU processing, or the ASR results may be rescored to factor in the NLU processing.

The process 500 begins at block 502. The process 500 may be performed in conjunction with the process 400, described above, or with any other process for processing ASR results in an NLU module. The process 500 may be embodied in a set of executable program instructions stored on a computer-readable medium, such as one or more disk drives, of a computing device associated with the spoken language processing system 100. When the process 500 is initiated, the executable program instructions can be loaded into memory, such as RAM, and executed by one or more processors of the computing system.

At block 504, the named entity resolver 144 or some other component of the NLU module 104 may initiate resolution of the named entities identified by the named entity recognizer 140. For example, the named entity resolver 144 may query a data store 106 as described above.

At decision block 506, the named entity resolver 144 or some other component of the NLU module 104 can determine whether the named entity values may be resolved satisfactorily. For example, if the results of named entity resolution do not provide values for the named entities with confidence scores or rankings that meet some threshold, the NLU module 104 may determine that the results are not satisfactory. In some cases, however, one or more of the named entities may be satisfactory, even though the results as a whole are unsatisfactory. The NLU module 104 can use the satisfactory result to rescore the ASR output or initiate reprocessing of the utterance at block 508. In some embodiments, the rescoring of ASR results may be an iterative process rather than a process triggered by failure to obtain satisfactory NLU results. For example, the NLU module 104 may perform named entity recognition on one or more of the terms to identify named entities (e.g., artist and album). The spoken language processing system 100 may then re-run ASR or rescore ASR output based on the named entity (or multiple named entities) that has the highest confidence score.

At block 508, the NLU module 104 can rescore the ASR results based on the partial or preliminary results of NLU processing. For example, the NLU module 104 may have received a lattice of results from the ASR module 102 regarding a user request to play a particular song by a particular artist. The NLU module 104 may determine the artist name with a threshold level of confidence, but the NLU module 104 may be unable to determine the song title from the ASR results. A language model may be created or customized to give higher scores to candidate transcriptions that include song titles by the particular artist. By rescoring the lattice such that results that include songs by the likely artist are given a higher score or greater relevance than they otherwise would have been (e.g., by using LM rescoring based on the artist name), the results that include both the likely artist and songs actually performed by that likely artist can be identified and passed to the NLU module 104 for additional processing.

In some embodiments, ASR processing may be rerun instead of, or in addition to, the rescoring of the ASR results. For example, by identifying one named entity value with a particular level of confidence, the ASR module 102 may bias processing of the user utterance based on the known, likely named entity value. The ASR module 102 may use models that are customized or optimized to produce results that are relevant to the known, likely named entity value (e.g., more likely to recognize and produce results with titles of songs that are performed by the artist).

At block 510, NLU processing, such as the process 400 described above, may then be rerun on the updated ASR results. In some cases, the process 500 may be executed again in an iterative or recursive fashion until all named entities are determined with a level of confidence that meets a threshold.

In some embodiments, the NLU processing may occur substantially in parallel with the ASR processing, such that the NLU module 104 may being to process ASR results before the ASR module 102 has completely finished producing the ASR results. By providing preliminary or partial NLU results to the ASR module 102 during ASR processing, the ASR module 102 may be able to dynamically adjust its processing to produce more accurate results for the remainder of the utterance, or the ASR module 102 may restart ASR processing (e.g., with different models selected based on the preliminary NLU processing).

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors in communication with the computer-readable memory, wherein the one or more processors are programmed by the executable instructions to at least:
receive data regarding an utterance of a user, the utterance associated with a user request;
generating first speech recognition results from the utterance and a language processing model;
determine, based at least partly on the first speech recognition results, a first named entity and a second named entity;
search a data store using the first named entity to determine a first resolved named entity associated with a first confidence score, wherein the first confidence score indicates a likelihood that the first resolved named entity corresponds to the first named entity;
search the data store using the second named entity to determine a second resolved named entity associated with a second confidence score, wherein the second confidence score indicates a likelihood that the second resolved named entity corresponds to the second named entity, and wherein the data store comprises information indicating that the first resolved named entity is associated with the second resolved named entity;
determine that the first confidence score associated with the first resolved named entity meets or exceeds a threshold confidence score;
determine a combined score based on the confidence score associated with the first resolved named entity and the confidence score associated with the second resolved named entity;
determine that the combined score does not meet or exceed the threshold confidence score;
obtain second speech recognition results from the first speech recognition results and the first resolved named entity;
determine, based at least partly on the second speech recognition results, a third resolved named entity included in the data store, wherein the third resolved named entity is associated with a third confidence score that meets or exceeds the threshold confidence score; and
generate a response based at least partly on the third resolved named entity.

2. The system of claim 1, wherein the one or more processors are programmed by the executable instructions to obtain the second speech recognition results from the first speech recognition results and the first resolved named entity by:
adjusting confidence scores associated with the first resolved named entity in the language processing model used to generate the first speech recognition results; and
generating the second speech recognition results from the language processing model and the utterance.

3. The system of claim 1, wherein the one or more processors are programmed by the executable instructions to determine the first resolved named entity by searching the data store using a phonetic representation of the first named entity.

4. The system of claim 1, wherein the user request is associated with one of: dialing a phone, initiating a shopping transaction, getting directions, playing music, or performing a search.

5. A computer-implemented method comprising:
under control of one or more computing devices configured with specific computer-executable instructions,
obtaining first speech recognition results related to an utterance of a user;
processing the first speech recognition results to identify:
a first named entity; and
a second named entity;
determining that the first named entity is associated with the second named entity;
performing a search of a data store for the first named entity and the second named entity, wherein the data store comprises a plurality of resolved named entities and information indicating relationships between resolved named entities in the plurality of resolved named entities;
determining, from the search of the data store, that the first named entity corresponds to a first resolved named entity and that the second named entity corresponds to a second resolved named entity, wherein the information of the data store indicates that the first resolved named entity is related to the second resolved named entity;
determining that a confidence score associated with the first resolved named entity meets or exceeds a threshold confidence score;
obtaining second speech recognition results based on the first resolved name entity; and
generating a response based at least partly on the second speech recognition results.

6. The computer-implemented method of claim 5, wherein the first resolved named entity comprises a song, the second resolved named entity comprises an artist, and the information of the data store indicates that the song corresponds to the artist.

7. The computer-implemented method of claim 5, wherein the plurality of relationships in the data store is organized as a plurality of documents, wherein each document of the plurality of documents comprises index values related to valid combinations of the plurality of resolved named entities.

8. The computer-implemented method of claim 7, wherein performing the search of the data store comprises performing a document search of the plurality of documents for one or more index values corresponding to the first named entity and the second named entity.

9. The computer-implemented method of claim 8, wherein the valid combinations of the plurality of resolved named entities comprise combinations of phonetic representations of resolved named entities.

10. The computer-implemented method of claim 5, wherein:
performing the search of the data store for the first named entity and the second named entity further comprises retrieving a plurality of resolved named entity combinations from the data store, wherein each of the resolved named entity combinations is associated with a confidence score; and
determining, from the search of the data store, that the first named entity corresponds to the first resolved named entity and that the second named entity corresponds to the second resolved named entity comprises selecting a resolved named entity combination comprising the first resolved named entity and the second resolved named entity based at least partly on a confidence score associated with the resolved named entity combination that is selected.

11. The computer-implemented method of claim 5, further comprising:
   retrieving a first plurality of resolved named entities corresponding to the first named entity, wherein each of the first plurality of resolved named entities is associated with a confidence score; and
   retrieving, from the data store, a second plurality of resolved named entities corresponding to the second named entity, wherein each of the second plurality of resolved named entities is associated with a confidence score;
   wherein determining that the first named entity corresponds to the first resolved named entity and that the second named entity corresponds to the second resolved named entity comprises selecting the first resolved named entity and the second resolved named entity based at least partly on the confidence scores associated with the first plurality of resolved named entities and the second plurality of resolved named entities.

12. The computer-implemented method of claim 5, wherein:
   the first speech recognition results comprise a plurality of candidate transcriptions of the utterance, each of the plurality of candidate transcriptions associated with a confidence score, and
   generating second speech recognition results based on the first resolved name entity comprises causing rescoring of a confidence score of a candidate transcription of the plurality of candidate transcriptions based at least partly on the first resolved named entity.

13. The computer-implemented method of claim 5, wherein the utterance comprises words related to a command to perform at least one of: dialing a phone number, initiating a shopping transaction, getting directions, playing music, or performing a search.

14. One or more non-transitory computer readable media comprising executable code that, when executed, cause one or more computing devices to perform a process comprising:
   performing automatic speech recognition on an utterance of a user to generate first speech recognition results;
   processing the first speech recognition results to identify:
      a first named entity; and
      a second named entity;
   determining that the first named entity is associated with the second named entity;
   performing a search of a data store for the first named entity and the second named entity, wherein the data store comprises a plurality of resolved named entities and information indicating relationships between resolved named entities in the plurality of resolved named entities;
   determining, from the search of the data store, that the first named entity corresponds to a first resolved named entity and that the second named entity corresponds to a second resolved named entity, wherein the information of the data store indicates that the first resolved named entity is related to the second resolved named entity;
   determining that a confidence score associated with the first resolved named entity meets or exceeds a threshold confidence score;
   obtaining second speech recognition results based on the first resolved name entity; and
   generating a response based at least partly on the second speech recognition results.

15. The one or more non-transitory computer readable media of claim 14, wherein:
   the process further comprises adjusting confidence scores associated with the first resolved named entity in a language model used to generate the first speech recognition results; and
   obtaining the second speech recognition results based on the first resolved name entity comprises generating the second speech recognition results from the language model and the utterance.

16. The one or more non-transitory computer readable media of claim 15, wherein a confidence score associated with the second resolved named entity is not adjusted in the language model used to generate the first speech recognition results.

17. The one or more non-transitory computer readable media of claim 15, wherein the plurality of relationships in the data store is organized as a plurality of documents, wherein each document of the plurality of documents comprises index values related to valid combinations of the plurality of resolved named entities.

18. The one or more non-transitory computer readable media of claim 17, wherein performing the search of the data store comprises performing a document search of the plurality of documents for on one or more index values corresponding to the first named entity and the second named entity.

19. The one or more non-transitory computer readable media of claim 18, wherein the one or more index values correspond to phonetic representations of the first named entity and the second named entity.

20. The computer-implemented method of claim 5, wherein determining that the first named entity is associated with the second named entity comprises:
   determining content of the first named entity and content of the second named entity; and
   determining that the content of the first named entity is related to the content of the second named entity.

21. The computer-implemented method of claim 5, wherein determining that the first named entity is associated with the second named entity comprises:
   determining a command from the first speech recognition results; and
   determining that the first named entity and the second named entity are related to the command.

22. The computer-implemented method of claim 21, wherein:
   the first named entity corresponds to an artist;
   the second named entity corresponds to a song; and
   and the command corresponds to a command to play the song by the artist.

23. The computer-implemented method of claim 5, wherein obtaining the second speech recognition results based on the first resolved name entity comprises rescoring the first speech recognition results by increasing confidence scores of results in the first speech recognition that include the first resolved named entity.

24. The computer-implemented method of claim 5, further comprising adjusting confidence scores associated with the first resolved named entity in a language model used to generate the first speech recognition results,
   wherein obtaining the second speech recognition results based on the first resolved name entity comprises generating the second speech recognition results from the language model and the utterance.

25. The computer-implemented method of claim 5, further comprising:
   obtaining a phonetic representation of the first named entity and a phonetic representation of the first resolved named entity;
   performing a comparison of the phonetic representation of the first named entity and the phonetic representation of the first resolved named entity; and
   determining the confidence score associated with the first resolved named entity based at least in part on the comparison, wherein the confidence score indicates a likelihood that the first resolved named entity corresponds to the first named entity.

26. The computer-implemented method of claim 5, wherein:
   a named entity is a word representing, at least in part, a possible intent of the user; and
   a resolved named entity is a named entity stored in the data store and having a known relationship with another resolved named entity stored in the data store.

* * * * *

UNITED STATES PATENT AND TRADEMARK OFFICE
CERTIFICATE OF CORRECTION

| | | |
|---|---|---|
| PATENT NO. | : 9,454,957 B1 | Page 1 of 1 |
| APPLICATION NO. | : 13/786237 | |
| DATED | : September 27, 2016 | |
| INVENTOR(S) | : Lambert Mathias | |

It is certified that error appears in the above-identified patent and that said Letters Patent is hereby corrected as shown below:

In the Specification

In Column 1 at Line 53, after "implemented" insert --.--.

In Column 4 at Line 10, after "thereof" insert --.--.

In the Claims

In Column 17 at Line 16, in Claim 11, change "score;" to --score,--.

In Column 18 at Line 29, in Claim 18, after "for" delete "on".

In Column 18 at Line 53, in Claim 22, after "song;" delete "and".

Signed and Sealed this
Twentieth Day of March, 2018

Andrei Iancu
*Director of the United States Patent and Trademark Office*